US006873782B2

(12) United States Patent  (10) Patent No.: US 6,873,782 B2
Miller et al.  (45) Date of Patent: Mar. 29, 2005

(54) OPTICAL FIBER ARRAY ASSEMBLY AND METHOD OF MAKING

(75) Inventors: Randall Miller, Nampa, ID (US); Jonathan Sherman, Caldwell, ID (US)

(73) Assignee: Fiberguide Industries, Inc., Stirling, NJ (US)

( * ) Notice: Subject to any disclaimer, the term of this patent is extended or adjusted under 35 U.S.C. 154(b) by 0 days.

(21) Appl. No.: 10/687,543

(22) Filed: Oct. 16, 2003

(65) Prior Publication Data

US 2004/0131326 A1 Jul. 8, 2004

Related U.S. Application Data

(60) Provisional application No. 60/421,032, filed on Oct. 24, 2002.

(51) Int. Cl.[7] ............................. G02B 6/00; G02B 6/36
(52) U.S. Cl. .......................................... 385/137; 385/91
(58) Field of Search ............................. 385/137, 88–94, 385/33, 34

(56) References Cited

U.S. PATENT DOCUMENTS

| 5,907,650 | A | * | 5/1999 | Sherman et al. | 385/80 |
| 6,328,482 | B1 | * | 12/2001 | Jian | 385/88 |
| 6,470,123 | B1 | * | 10/2002 | Sherman et al. | 385/115 |
| 6,527,455 | B2 | * | 3/2003 | Jian | 385/88 |

* cited by examiner

Primary Examiner—Chandrika Prasad
(74) Attorney, Agent, or Firm—Edward Dreyfus, Esq.

(57) ABSTRACT

A high density, optical fiber array includes etched silicon front and guide masks anodically bonded to high temperature glass die plate and/or spacer. Optical fibers secured in the front plate holes have the same thermal expansion coefficient as the masks and die/spacer plates to reduce the need for certain epoxy interplate zones which would have a different thermal expansion coefficient. Methods and a system for making the mask/plate stack are also disclosed along with various plate stacking arrangements and the front plate anodically bonded to a glass lens array.

23 Claims, 3 Drawing Sheets

OPTICAL FIBER ARRAY ASSEMBLY AND METHOD OF MAKING

RELATED APPLICATION

U.S. Provisional Patent Application Ser. No. 60/421,032, filed Oct. 24, 2002.

BACKGROUND

The present invention relates to optical fiber arrays and more particularly to new array designs and methods of making the same.

It is commonly known in the art that there is a need for large, high-density optical fiber array apparatus used to connect or otherwise employ large numbers of optical fibers in transmission and switching systems. Although advances have recently been made in achieving high density arrays with the use of thin silicon or other etchable material front masks and photolithography techniques to form the high-density holes various related problems remain to be solved. Some of the problems result from the use of bonding materials (e.g. epoxy) to hold together the front mask and additional plates or masks. These plates or masks function as reinforcing plates, guide masks, fiber alignment masks, and housing-mask spacers, as desired. Applicants have found that the bonding materials tend to crack or separate in the field and moisture can collect in the tiny resulting spaces which, upon freezing, cause major cracks, separation, and problems, which shorten the life cycle or field life of the overall apparatus. Another resulting problem in high-density arrays is that the epoxy absorbs moisture which can adversely effect the critical flat-ness of the assembly front mask.

An object of the present invention is to solve these problems and provide other benefits in the design and construction of optical fiber arrays, connectors, and apparatus and methods of making the same.

SUMMARY OF EXEMPLARY EMBODIMENT OF THE INVENTION

The present invention includes an optical fiber array that includes mask assembly having a front mask made of etch able material, e.g. silicon, which is aligned with and permanently bonded, without the use of epoxy or other standard bonding material, to an etchable, e.g. silicon, guide mask. The silicon front and guide masks are, according to the principles of the present invention anodicly bonded to opposite sides of a glass bonding die which has the same or significantly similar coefficient of expansion as the front mask. In this way, the front mask bonding die, and other mask elements act as a single unit with substantially the same thermal expansion and contraction parameters. In addition, the bonding mechanism is permanent and does not absorb moisture that would cause separation of the masks and plates.

In one exemplary embodiment, the wafer is made of silicon and the bonding die can be made of any suitable high temperature resistant glass and the two elements are bonded together by anodic bonding techniques.

In another embodiment, silicon front and guide masks are bonded to an intermediate glass bonding die. The bonding die can be made of 7740 Pyrex (a registered trademark of Corning Glass, Inc.), or Borofloat (a registered trademark of JENAer Glaswerkeg NbH) or other suitable high temperature resistant glass.

In yet a further embodiment, the silicon guide mask of the three element wafer pack is further anodicly bonded to a glass spacer that functions to strengthen the pack against polishing forces and provide a mounting platform to the array housing. The spacer material can be the same as the bonding die material and its thickness dimension predetermined to precisely position the front mask surface relative to the housing or other optional elements that interact with the fiber ends held in the front mask.

Anodic bonding is a known process for joining glass elements to various materials having a similar structure. Conventional apparatus includes a hot plate for heating the assembly, an anode for providing a positively charged electrode source such as an electrolytic cell, storage battery, or electron tube, and a cathode or negatively charged element from, such as, an electrolytic cell, storage battery, or electron tube. A mounting fixture with some means for supporting and aligning the elements to be bonded is also used. Controllers provide power, polarity, timing, etc. to control the process.

For greater detail of anodic bonding, see (1) SELECTION OF GLASS, ANODIC BONDING CONDITIONS AND MATERIAL COMPATIBILITY FOR SILICON-GLASS CAPACITIVE SENSORS, by T. Rogers, J. Kowal, *Sensors and Actuators*, A 46–47 (1995) 113–120; (2) http://mems.eeap,cwru.edu/shortcourse/partI 2.html, section 2.3.1; (3) SILICON WAFER BONDING: KEY TO MEMS HIGH-VOLUME MANUFACTURING, A. R. Mirza, A. A. Ayon, *Sensors Magazine*, December 1998.

In one present process example, the hole matrixes of the stacked front silicon mask and glass element bonding die are aligned. The process elevates the silicon mask/bonding die package temperature and bonds silicon to Pyrex by applying a negative potential to the Pyrex element which creates a standing electric field across the elements interfaces. Sodium positive ions in the glass bonding die are driven to the cathode to create a space charge at the Pyrex silicon interface. This space charge produces strong electrostatic forces between the silicon wafer and Pyrex bonding die that holds both pieces together. Oxygen ions from the Pyrex simultaneously transfer to the interface of glass and silicon to form a thin silicon dioxide film, which creates a permanent bond at the interface. No film is formed across the aligned array holes of these parts. Although anodic bonding process is generally known, its application to optical fiber front and guide, plate bonding is believed to be novel because of the technical problems solved and new benefits provided by application of this process to the manufacture and performance of high density optical fiber arrays.

A further exemplary embodiment of the present invention includes forming a wafer pack that includes a silicon front mask wafer, a glass bonding die made of high thermal resistant glass, a silicon guide mask, and, optionally, a glass spacer stacked in that order. These elements are anodicly bonded together into a wafer pack so that they are permanently bonded without application of epoxy or equivalent materials. In order to bond the silicon guide mask to the bonding die, the bonding field polarity is reversed so that the previous anode/cathode becomes the cathode/anode in function. In this way the bond between the front mask and bonding die is unaffected and the bond between the bonding die and guide mask is formed in the same manner described above.

If a spacer is desired the present invention includes positioning the glass spacer to the rear of the silicon guide mask and anodicly bonding these parts, again by reversing the polarity to the bonding field. The other bonds in the stack are unaffected by the spacer-guide mask bonding process.

Yet a further object of the present invention is to provide a new mask assembly of the type described that includes a silicon front mask, glass bonding die, silicon guide mask, and glass spacer in that order, and each adjoining surface of each element being bonded to the adjacent surface by a layer of oxide material formed by migrated ions of the glass elements respectively.

A still further object is to provide a silicon front mask anodicly bonded to a glass lens array element.

DESCRIPTION OF THE DRAWINGS

Other further objects, benefits and advantages will become apparent with the following detailed description of exemplary embodiments of the present invention when taken in view of appended drawings, in which.

DETAILED DESCRIPTION OF EXEMPLARY EMBODIMENTS OF PRESENT INVENTION

Figure 1:
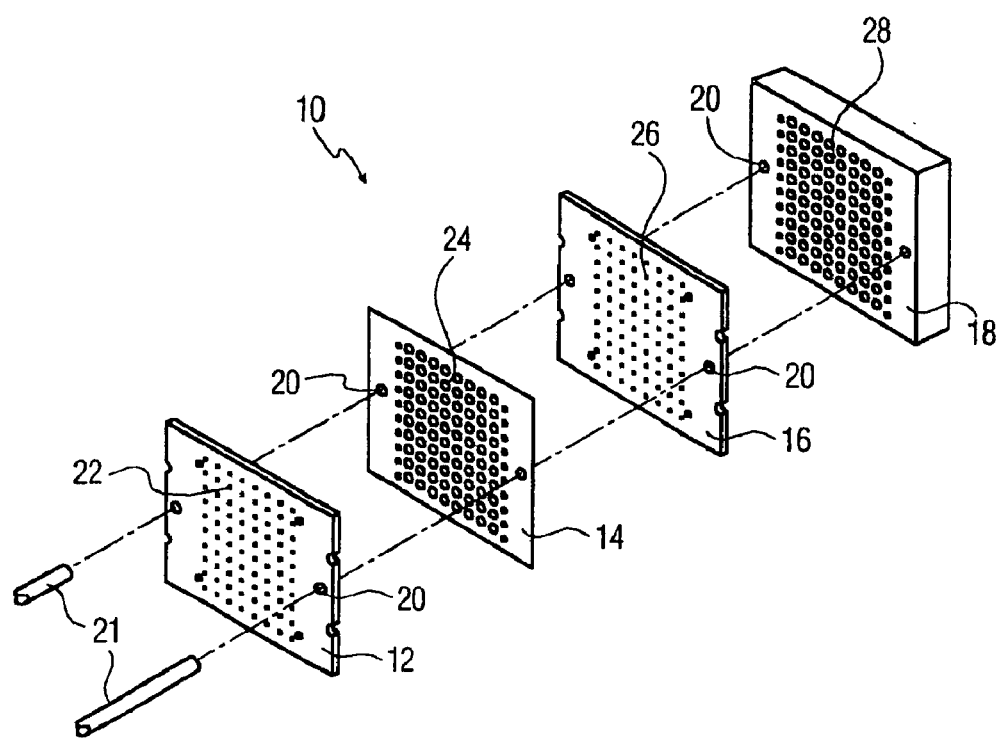
FIG. 1 is an exploded perspective elevation view of one example of wafer pack elements to be stacked and bonded in accordance with the principles of the present invention.
Figure 2:
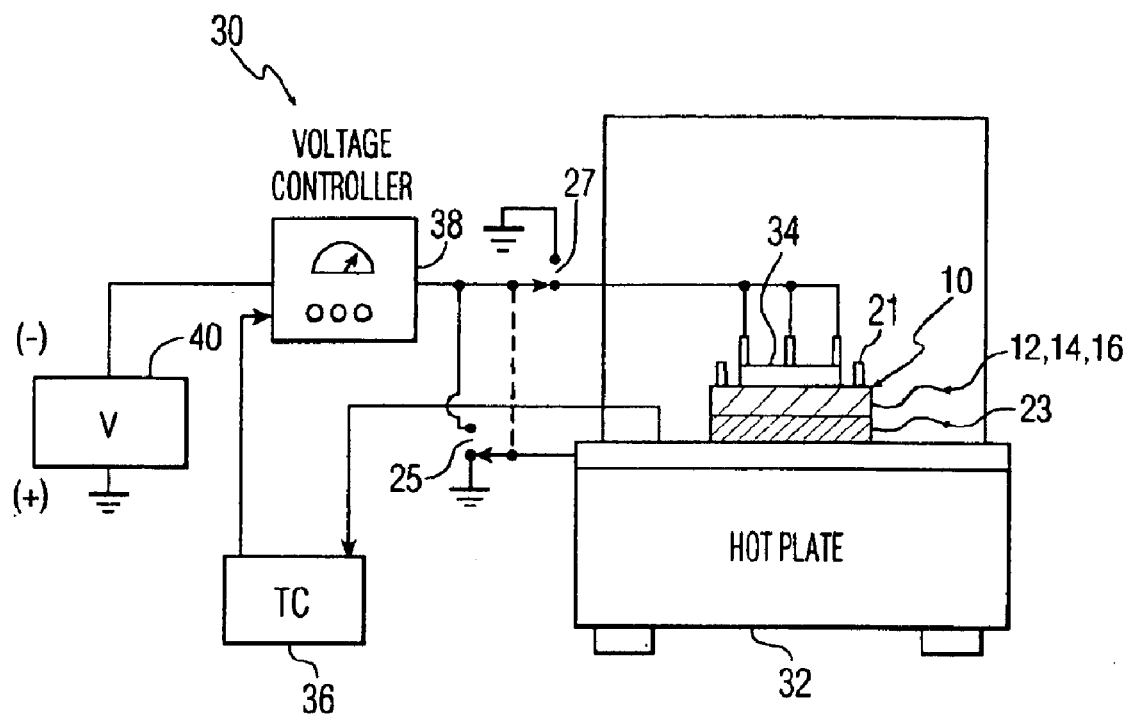
FIG. 2 is a schematic and pictorial view of the apparatus that can be used to form the bonded wafer pack and process according to the principles of the present invention.
Figure 3:
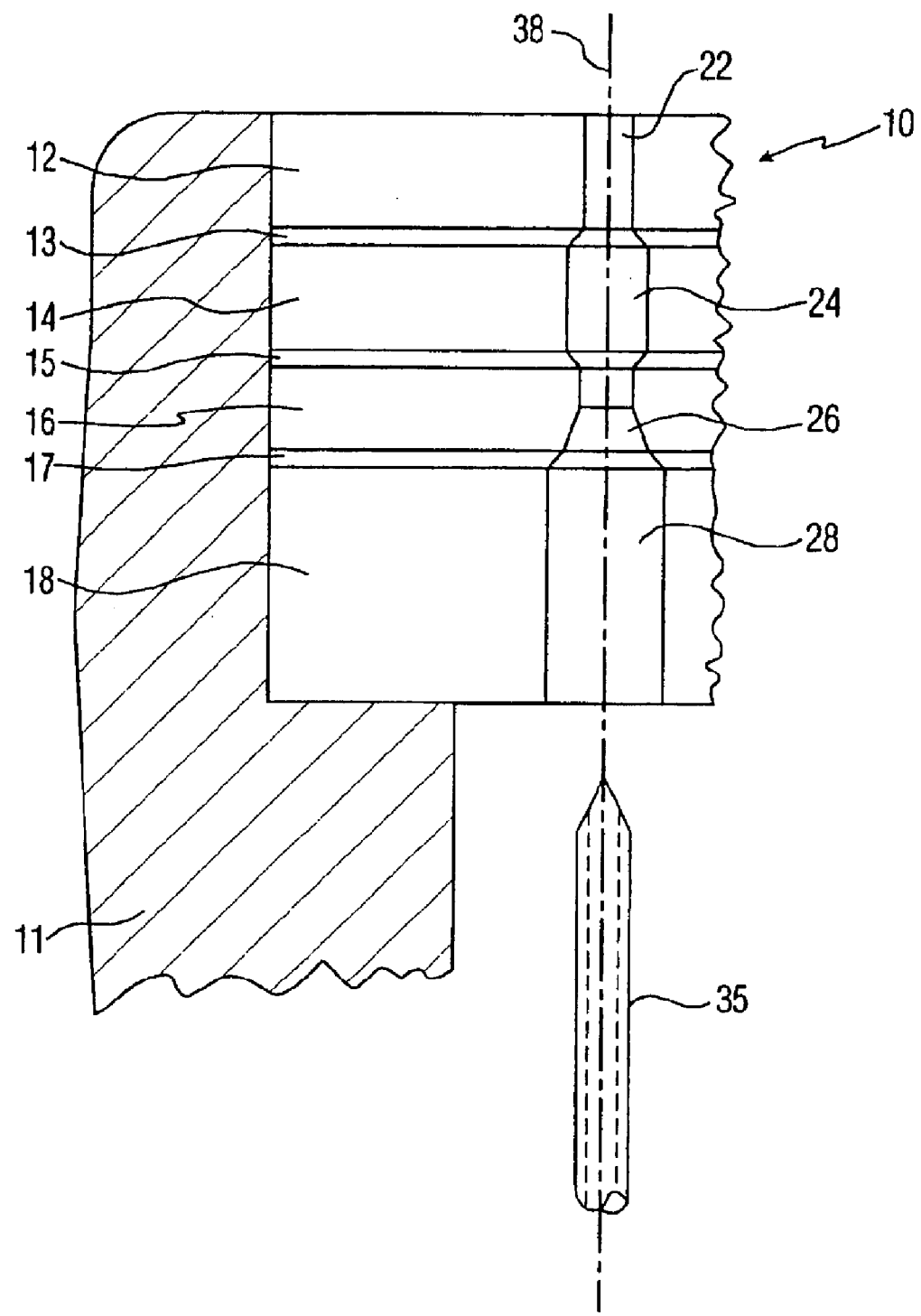
FIG. 3 is an exploded, partial vertical section of the wafer pack of FIG. 1 after it is anodicly bonded.

With reference to FIGS. 1–3, one example of a wafer pack 10 according to the principles of the present invention include a high density front mask wafer 12 having an array of precisely positioned and dimensioned holes 22, a bonding die plate 14 having corresponding holes 24, a guide or second wafer 16 having corresponding holes 26, and a high thermal resistance glass plate 18 having corresponding holes 28. Plate 18 can function as a spacer by selecting its thickness to precisely position the front surface of wafer 12. Also, plate 18 can function as a support plate to reinforce the other elements during polishing and grinding wafer 12 front surface. Each of these elements includes suitable means to precisely align each element with the others so that all respective array holes 22–28 become precisely aligned along common hole axes 38. See FIG. 3. One example of such means is shown in FIGS. 1 and 2 as alignment holes 20 that cooperate with alignment pins 21, further described below.

In a preferred embodiment wafers 12 and 16 includes thin, etchable material, such as 125 micron thick silicon. Wafer 12 is intended to function as a front mask for an optical fiber connector or other optical device having 8×8, 19×19 or higher array holes. Second wafer 16 can also be made as a thin plate and function as a guide mask to guide the insertion and penetration in the front mask of the front cladded core portions of individual optical fibers, such as 35, FIG. 3. Wafer 16, too, can be made of silicon or other suitable etchable material. Holes 22 can have straight cylindrical sidewalls as shown or be flared as desired to assist in fiber tip insertion. Holes 26 can be cylindrical toward the surface facing mask 12 and flared outward toward the back-side of wafer 16, as shown, or can be cylindrical or conical throughout as desired.

Bonding die 24 is preferably made of high thermal resistant glass and serve as a spacing, reinforcing or strength element to wafers 12, 16. Holes 24 can be shaped to guide inserted fibers or can be larger as shown so that bonding die simply functions as a spacer and/or strength element. Glass spacer 18 provides reinforcement to the finished wafer pack and serves as a mounting element at or near the front zone of a metal or plastic housing 11, FIG. 3. Holes in plates 14, 18 can be formed by ultrasonic milling or other suitable method.

Examples of the types of housings, masks, hole designs, apparatus, assembly methods, parts designs, features, and functions are described in more detail in U.S. Pat. No. 5,907,650 and U.S. patent application Ser. Nos. 09/841,686 and Publication WO 01/94995 A2 all incorporated herein by reference.

An exemplary anodic bonding apparatus 30 suitable to carry out the present method includes a hot plate apparatus 32, a temperature sensor (thermocouple) 36, voltage/controller 38 to apply, control and indicate anode/cathode voltage, and electric power source 40 and one or more electrodes 34 function to apply voltage fields more fully described below. Preferably, surface of hot plate 32 is grounded and functions as a system electrode. Also, alignment pins 21 cooperate with alignment holes 20 as described above to align the array holes of elements 12, 14, and 16. Pins 21 can be made of stainless steel, ceramic, glass, or other suitable material. Additional glass pins or cut pieces of fiber (not shown) can insert through array holes (preferably located at the array corners) and can have the same diameter as the fiber diameter to align the array holes more accurately than with the use of larger pins 21 alone or instead of using pins 21. Plate 23 can be ¼ to ½ inch thick and made of low expansion metal, such as 416 steel, COVAR or INVAR preferably lapped and polished to a very flat surface and finish on both sides. Devices such as gauged switches 25, 27 provide voltage polarity reversal between anode and cathode.

An exemplary method of forming a wafer pack will now be described with reference to FIGS. 1, 2 and 3. Typically, element thicknesses are silicon wafers 500–650 µm, bonding die 250 µm, spacer 0.125 inches.

Prepare Pieces
    Provide etched silicon wafers 12, 16.
    Provide a high thermal resistant glass (e.g. Corning 7740 Pyrex) spacer 18 and bonding die 14.
    Clean all parts per Corning 7740 glass specifications except for HF section.

Prepare for Bonding
    Stack plates 12, 14, and 16 in order shown in FIG. 1 on pins 21 with wafer 12 front face facing away from die 14.
    Place stack on mounting die 23 with front face of plate 12 contacting mounting die 23.
    Place mounting die 23 on hot plate 32

Bonding
    Ramp up hot plate 32 surface temperature to between 300°–450° C.
    Then turn on (apply) voltage supply to within range of 1000V–1200V and hold for 8 to 12 minutes, preferably 10 minutes.
    Reverse voltage polarity and hold for about four minutes.
    Thereafter, turn off hot plate 32 but leave on voltage 40 for an additional 5–20 minutes.
    Thereafter, allow plate to cool to 100° C., then remove bonded wafer pack.

To Bond Spacer 18 Element

Pre-clean spacer 18

Mount spacer 18 on pins 21 (and/or on additional pins) so its front surface contacts the back surface of wafer 16.

Place or leave mounting die 23 and wafer pack 10 on hot plate. Ramp up hot plate temperature to 3000–450° C.

Reverse (i.e. change to original polarity) and apply voltage 40 to within range of 1000V–1200V for about 8 to 12 minutes, preferably 10 minutes.

Turn off hot plate but leave voltage 40 on for an additional 5–20 minutes.

As seen in FIG. 3 sodium ion and oxide layers 13, 15, 17 have formed between wafer 12, bonding die 14, wafer 16 and spacer 18, respectively. The pack 10 is therefore permanently bonded as a unit with array holes 22, 24, 26, and 28 aligned along the same axes 38 normal to the planes of the wafer and plate or die elements.

Figure 4:
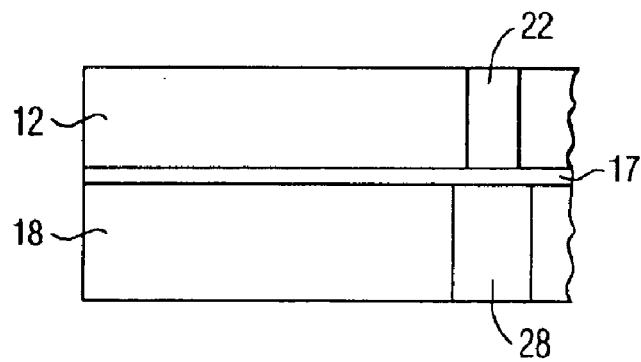
FIG. 4 is similar to FIG. 3 showing an alternate embodiment of bonded plates, according to the present invention.

An alternate embodiment is shown in FIG. 4 in which front mask 12 is bonded anodicly directly to spacer plate 18 by the above-mentioned process except that polarity reversal is not needed for two element bonding. Oxide layer 17 in this case forms at the interface of these two elements.

Figure 5:
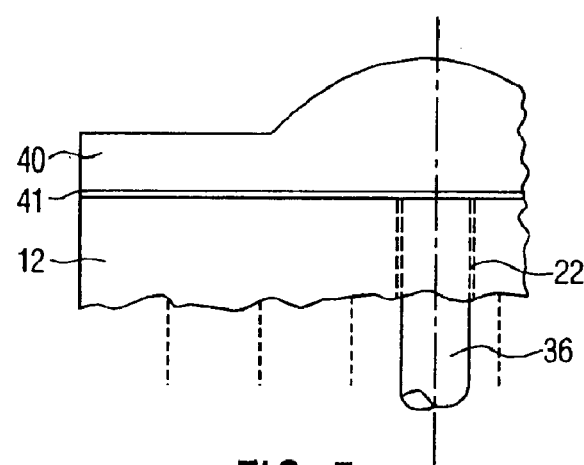
FIG. 5 is yet another alternate embodiment of the present invention including a silicon front mask and a glass lens element.

Yet a further embodiment is shown in FIG. 5 in which front mask 12 front surface is bonded anodicly directly to a glass lens element 40 after fibers 35 are seated and secured with standard epoxy application (not shown) and the front mask ground and polished. Lens 40 can be convex or concave as desired. A layer of oxide material forms at the interface of the lens/front 41 mask as stated above. The dotted line indicates other plates and/or masks could have been bonded as part of the package as desired.

It will be understood the drawings are conceptual and not drawn to scale.

It should be understood that an alternate exemplary method includes forming the initial sub-stack and anodicly bonding wafer 12 to die 14. After that, wafer 16 is added to the sub-stack and anodicly bonded to die 14. After that, glass spacer 18 could be added to the stack and then anodicly bonded to wafer 16. Also, in all applications of the above embodiments, fibers seated in the front mask should be secured therein, e.g. by way of standard epoxy application to the front mask front surface after which the exposed fiber tips, epoxy, and front mask surface can be ground and/or polished as desired. See for example U.S. Pat. No. 5,907,650.

What is claimed is:

1. The method of making an optical fiber array comprising:
   providing a first mask having a first plurality of longitudinally extending holes and a forward surface and a rear surface,
   providing an anodic bonding element having a first like-plurality of longitudinally extending holes,
   aligning said first mask and said bonding element so that the first plurality of holes and the first like-plurality of holes are substantially longitudinally aligned, and
   first anodic bonding the first mask rear surface and the bonding element together, and
   securing a plurality of optical fibers in said first plurality of holes.

2. The method of claim 1 wherein said bonding element comprises a bonding die.

3. The method of claim 2 wherein the first mask, the bonding die and the optical fibers are formed of materials that have substantially the same coefficient of thermal expansion.

4. The method of claim 1 wherein said bonding element comprises a spacer.

5. The method of claim 1 further comprising anodic bonding the forward surface of the first mask to a glass lens array having a number of lens elements and wherein the fibers optically cooperate with the lens elements.

6. The method of making an optical fiber array comprising:
   providing a first mask having a first plurality of longitudinally extending holes and a forward surface and a rear surface,
   providing an anodic bonding element having a first like-plurality of longitudinally extending holes,
   aligning said first mask and said bonding element so that the first plurality of holes and the first like-plurality of holes are substantially longitudinally aligned, and
   first anodic bonding the first mask rear surface and the bonding element together, and
   securing a plurality of optical fibers in said first plurality of holes, and wherein
   said bonding element comprises a bonding die, and wherein the first mask, the bonding die and the optical fibers are formed of materials that have substantially the same coefficient of thermal expansion, and further comprising
   providing a second mask having a second like-plurality of longitudinally extending holes longitudinally aligned with the first plurality of holes, and
   second anodic bonding the second mask and said bonding die together, and wherein
   the plurality of fibers extend through the first and second like-plurality of holes prior to and during said securing step.

7. The method of claim 6 wherein the second mask is formed of material that has substantially the same coefficient of thermal expansion as the optical fibers.

8. The method of making an optical fiber array comprising:
   providing a first mask having a first plurality of longitudinally extending holes,
   providing a bonding element having a first like-plurality of longitudinally extending holes,
   aligning said first mask and said bonding element so that the first plurality of holes and the first like-plurality of holes are substantially longitudinally aligned, and
   first anodic bonding the first mask and the bonding element together, and
   securing a plurality of optical fibers in said first plurality of holes, and wherein
   said bonding element comprises a bonding die, and wherein the first mask, the bonding die and the optical fibers are formed of materials that have substantially the same coefficient of thermal expansion, and further comprising
   providing a second mask having a second like-plurality of longitudinally extending holes longitudinally aligned with the first plurality of holes, and
   second anodic bonding the second mask and said bonding die together, and wherein
   the plurality of fibers extend through the first and second like-plurality of holes prior to and during said securing step, and further comprising,
   providing a spacer having a third like-plurality of longitudinally extending holes substantially longitudinally aligned with the second like-plurality of holes,
   third anodic bonding the spacer and the second mask together, and the plurality of fibers extend through the spacer prior to and during said securing step.

9. The method of claim 8 wherein the spacer is formed of material that has substantially the same coefficient of thermal expansion as the optical fibers.

10. The method of claim 8 wherein the first mask, bonding die and second mask form at least a partial stack and the at least partial stack is heated during anodic bonding.

11. The method of claim 10 wherein first anodic bonding includes providing DC voltage of a first polarity between the front and back of the at least partial stack while the stack is heated.

12. The method of claim 11 wherein second anodic bonding includes providing DC voltage of a second polarity between the front and back of the at least partial stack while stack is heated.

13. The method of claim 12 wherein the heating of the at least partial stack maintains substantially the same at least partial stack temperature from at least the end of said first anodic bonding to at least the start of said second anodic bonding.

14. The method of claim 10 wherein the spacer is included in the at least partial stack,
said third anodic bonding step occurring at least partially during said first anodic bonding step.

15. The method of claim 10 wherein the spacer is included in the at least partial stack,
said third anodic bonding step occurring after said second anodic bonding step.

16. An optical fiber array comprising:
a first mask having a first plurality of longitudinally extending holes and a forward surface and a rear surface,
an anodic bonding element having a first like-plurality of longitudinally extending holes,
said first mask and said bonding element arranged so that the first plurality of holes and the first like-plurality of holes are substantially longitudinally aligned, and
the first mask rear surface and the bonding element being bonded together by a layer of sodium ions and oxides of the first mask and bonding element materials, and
a plurality of optical fibers extended through the bonding element holes and secured in said first plurality of holes.

17. The array of claim 16 wherein said bonding element comprises a bonding die.

18. The array of claim 17 wherein the first mask, the bonding die and the optical fibers are formed of materials that have substantially the same coefficient of thermal expansion.

19. The array of claim 18 further comprising
a second mask having a second like-plurality of longitudinally extending holes longitudinally aligned with the first plurality of holes, and
the second mask and said bonding die being bonded together by a layer of sodium ions and oxides of the second mask and bonding die materials, and wherein
the plurality of fibers extend through said first and said second like-plurality of holes.

20. The array of claim 19 wherein the second mask is formed of material that has substantially the same coefficient of the thermal expansion as the optical fibers.

21. The array of claim 16 further comprising a glass lens array bonded to the forward surface of said first mask by a layer of sodium ions and oxides of the first mask and glass lens array materials, and wherein
the fibers optically cooperate with said glass lens array.

22. An optical fiber array comprising:
a first mask having a first plurality of longitudinally extending holes,
a bonding element having a first like-plurality of longitudinally extending holes,
said first mask and said bonding element arranged so that the first plurality of holes and the first like-plurality of holes are substantially longitudinally aligned, and
the first mask rear surface and the bonding element being bonded together by a layer of sodium ions and oxides of the first mask and bonding element materials, and
a plurality of optical fibers extending through the bonding elements holes and secure in said first plurality of holes,
Said bonding element comprises a bonding die,
the first mask, the bonding die and the optical fibers being formed of materials that have substantially the same coefficient of thermal expansion,
a second mask having a second like-plurality of longitudinally extending holes longitudinally aligned with the first plurality of holes, and
the second mask and said bonding die being bonded together by a layer of sodium ions and oxides of the second mask and bonding die materials, and wherein
the plurality of fibers extend through the first and said second like-plurality of holes, and wherein
the second mask is formed of material that has substantially the same coefficient of the thermal expansion as the optical fibers, and further comprising
a spacer having a third like-plurality of longitudinally extending holes substantially longitudinally aligned with the second like-plurality of holes,
the spacer and the second mask being bonded together by a layer of sodium ions and oxides of the second mask and spacer materials, and
the plurality of fibers extending through the spacer third like-plurality of holes.

23. An optical fiber array comprising:
a first mask having a first plurality of longitudinally extending holes and a forward surface and a rear surface,
a an anodic bonding element having a first like-plurality of longitudinally extending holes,
said first mask and said bonding element arranged so that the first plurality of holes and the first like-plurality of holes are substantially longitudinally aligned, and
the first mask rear surface and the bonding element being bonded together by a layer of sodium ions and oxides of the first mask and bonding element materials, and
a plurality of optical fibers extending through the bonding elements holes and secure in said first plurality of holes, and
wherein said bonding element comprises a spacer with a predetermined longitudinal thickness related to a longitudinal dimension of the front portion of the array housing.

* * * * *